UNITED STATES PATENT OFFICE.

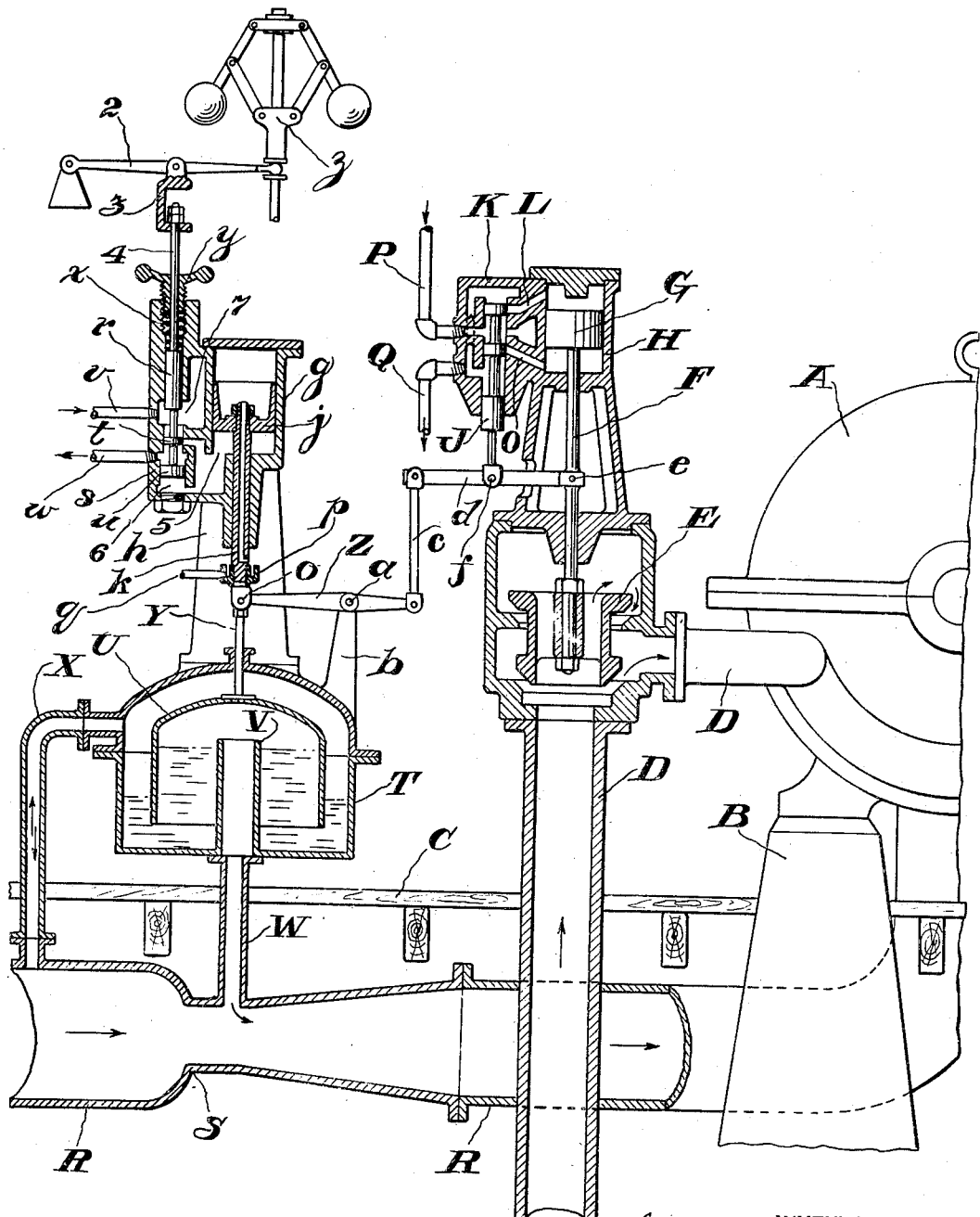

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY.

CONSTANT-VOLUME REGULATOR FOR TURBOCOMPRESSORS.

1,411,701. Specification of Letters Patent. Patented Apr. 4, 1922.

Application filed February 19, 1921. Serial No. 446,387.

*To all whom it may concern:*

Be it known that I, LESLIE R. HUFF, a citizen of the United States, a resident of Phillipsburg, county of Warren, and State of New Jersey, have invented a certain Constant-Volume Regulator for Turbocompressors, of which the following is a specification, accompanied by drawing.

This invention relates to a constant volume regulator for a turbo compressor, turbo blower or the like, by means of which the speed of the machine is so regulated that the volume of air delivered is maintained substantially constant, irrespective of the pressure required to overcome the resistance in the discharge line system.

In a regulator of this type, a movable member, which may conveniently be in the form of a bell shaped float, is subjected to pressure differences on the inside and outside from suitable sources, at least one of which should be a variable source, connected with the system to be regulated, and fluctuations in such pressure differences cause the float to rise and fall and afford means adapted to be connected through suitable levers or the like to the admission valve of the motor of the compressor for varying the amount of fluid supplied to the motor.

The objects of the invention are to stabilize the regulator, eliminate the usual dashpot for compensating the thrust, and enable a fluid pressure thrust cylinder and piston to be controlled by means of an automatic pilot valve which controls the supply of fluid under pressure to the compensating cylinder and relieves the pressure in said cylinder, thereby maintaining substantially constant pressure.

Another object of the invention is to enable the said pilot valve to be additionally controlled by a speed governor.

Further objects of the invention will hereinafter appear and the invention is shown in one of its preferred forms in the accompanying drawing, which is a diagrammatic longitudinal sectional elevation of the apparatus embodying the invention.

Referring to the drawings the turbo compressor A viewed from the steam end, is shown mounted on the foundation B, the floor line C being indicated with relation to the apparatus. Steam is admitted to the motor of the compressor through the supply pipe D controlled by the steam admission valve E of any suitable type, having the valve rod F provided with an actuating piston G in the cylinder H, although any other suitable type of valve actuating mechanism may be provided.

The valve piston G is preferably controlled by means of a pilot valve J operating in the valve casing K and controlling the passages L and O leading to the cylinder H. Oil or other fluid under pressure is supplied to the valve casing through the supply pipe P and discharged from the pipe Q.

The intake conduit R for the compressor is preferably formed with the restricted portion or the Venturi tube S, at which the velocity of the incoming fluid is increased as a Venturi tube forms a convenient device for use in connection with a regulater of this type.

A receptacle T is provided with a bell shaped float U, and the interior of the float is connected by the tube V and pipe W to the Venturi tube S. The outside of the float is preferably connected by the pipe X to a full diametered portion of the intake conduit R although under some circumstances, this pipe X might be open directly to the atmosphere. The bell rod Y is connected to one end of the balancing lever Z pivoted at $a$ in the bracket $b$, the other end of said lever being connected by the link $c$ to the pilot lever $d$ pivoted at $e$ on the valve rod F. The pilot valve J is shown pivoted at $f$ to the lever $d$.

In order to compensate for the thrust of the bell U, a fluid pressure thrust compensating cylinder $g$, suitably mounted on the frame $h$, is provided with a compensating piston $j$ preferably connected by a hollow piston rod $k$ to the compensating lever Z at the point $o$. The inside of the cylinder $g$ above the piston is open to atmosphere through the hollow piston rod $k$ and a drain collar $p$ on the piston rod permits fluid to drain off through the pipe $q$.

The supply of fluid under pressure beneath the compensating piston $j$ and the release of pressure beneath this piston is controlled in accordance with my invention by means of a compensating pilot valve $r$ operating in the valve chest $s$ and provided with the differential heads $t$ and $u$. Motive fluid, as for instance, air or oil under pressure, is supplied through the pipe $v$ and exhausted through the pipe $w$, and the pilot valve $r$ is subjected to the pressure of a spring $x$ tending to force the valve downwardly, the pressure of the spring being adjusted by means of the adjustable plug $y$. For purposes which will hereinafter appear, a speed governor $z$ adapted to be connected to the machine and of any suitable type, operates the pivoted lever 2 having the link 3 connected to the pilot valve stem 4 for controlling the valve in accordance with the speed of the engine.

The tension of the spring $x$ determines the pressure in the chamber 5 beneath the piston $j$ and the pressure in the chamber 6 beneath the larger head $u$ of the pilot valve $r$ will be the same as that in the pressure chamber 5.

The pilot valve $r$ is shown in closed or neutral position and the unbalancing of the regulator due to movement of the float U automatically causes the compensating pilot valve $r$ to operate and restore the balance of the regulator.

If the compression of the spring $x$ is sufficient to overcome the pressure in the chamber 6 beneath the larger head $u$ of the pilot valve, said valve will be moved downwardly, admitting fluid under pressure beneath the compensating piston $j$, and pressure will be built up under said piston and also under the larger head $u$ of the pilot valve $r$ until the valve is again restored to neutral position. On the other hand, if the pressure in the chambers 5 and 6 overcomes the pressure above the valve, the valve will be moved upwardly a sufficient distance to permit fluid to pass out of the pressure chamber 5 through the discharge pipe $w$ to relieve the pressure so that the valve may again return to neutral position. This action is automatic and automatically maintains substantially constant fluid pressure beneath the compensating piston $j$.

In addition, when the maximum speed of the speed governor $z$ is reached, the governor shifts the pilot valve rod 4 and pilot valve $r$ and produces a drain of the fluid from the compensating cylinder as described, reducing the fluid pressure so that the regulator may operate through its system of levers to further close the steam admission valve E and reduce the speed of the machine. When the speed is reduced to normal, the speed governor $z$ restores the pilot valve $r$ to neutral position and the volume regulator is again in control of the machine.

In the operation of the apparatus, let it be assumed, that the compressor is connected to supply a blast furnace, for instance, with constant volume of air. The resistance in the furnace of the passage of air varies, and if the resistance increases, the speed of the compressor must increase, in order to supply the same quantity of air through the compressor. If the resistance decreases, the speed must be reduced, to maintain a constant quantity of air and prevent too much air from passing. Upon an increase of resistance in the discharge of the compressor, the velocity head in the intake R is lowered, and decrease of suction in the bell U causes the bell to be moved upwardly by the piston $j$, pulling the pilot valve J downwardly from the neutral position indicated in the drawing and admits fluid under pressure beneath the valve piston G which moves upwardly and opens the steam admission valve E to a greater extent, thus increasing the speed of the engine. Upon a decrease of resistance in the discharge of the compressor, the suction in the intake is increased, the bell U is sucked or drawn downwardly and the pilot valve J is pushed upwardly admitting pressure above the valve piston G, forcing the admission valve E downwardly thus tending to close off the steam supply to a greater extent and decrease the speed of the engine.

The moment of the thrust of the bell U is compensated or balanced by the pressure in the compensating cylinder $g$.

To obtain adjustments for different volumes of air passed through the compressor, the hand screw $y$ for the controlling spring $x$ may be adjusted to vary the compression of the spring. When pressure on the bell U changes, the fluid pressure on the compensating piston $j$ and head $u$ of the pilot valve $r$ momentarily changes, but the pressure is brought back to a fixed amount by the shifting of the pilot valve.

I claim:

1. A constant volume regulator for a motor driven turbo compressor, comprising an intake conduit for the compressor, movable means for controlling the power delivered to the motor and actuated by the difference in pressure existing between two points in the intake of the compressor, due to the velocity of the fluid passed through the intake, a fluid pressure thrust compensating cylinder connected to said movable regulating means, connections for distributing fluid under pressure to said cylinder, and a pilot valve controlling said connections for automatically maintaining constant pressure in said compensating device.

2. A constant volume regulator for a motor driven turbo compressor, comprising an intake conduit for the compressor, movable means for controlling the power delivered to the motor and actuated by the difference in pressure existing between a point in the intake at which the velocity of the fluid is increased and a source of higher pressure, a fluid pressure thrust compensating cylinder connected to said movable regulating means, connections for supplying fluid under pressure to said cylinder and for relieving the pressure therein, and a pilot valve controlling said connections for automatically maintaining substantially constant pressure in said compensating cylinder.

3. A constant volume regulator for a motor driven turbo compressor, comprising an intake conduit for the compressor, a receptacle, a bell shaped float within said receptacle, one side of said float being subjected to fluid pressure at a point in the intake at which the velocity of the fluid is increased whereby fluctuations in pressure differences on the two sides of the float cause the float to move up or down to vary the amount of fluid supplied to the motor of the compressor, a fluid pressure thrust compensating cylinder connected to said float, connections for supplying fluid under pressure to said cylinder and for relieving the pressure therein, and a pilot valve controlling said connections for automatically maintaining substantially constant pressure in said compensating cylinder.

4. A constant volume regulator for a motor driven turbo compressor, comprising an intake conduit for the compressor, movable means for controlling the power delivered to the motor and actuated by the difference in pressure existing between two points in the intake of the compressor, due to the velocity of the fluid passed through the intake, a fluid pressure thrust compensating cylinder connected to said movable regulating means, connections for distributing fluid under pressure to said cylinder, a pilot valve controlling said connections for automatically maintaining constant pressure in said compensating device, and a speed governor connected to additionally control said pilot valve.

5. A constant volume regulator for a motor driven turbo compressor, comprising an intake conduit for the compressor, movable means for controlling the power delivered to the motor and actuated by the difference in pressure existing between a point in the intake at which the velocity of the fluid is increased and a source of higher pressure, a fluid pressure thrust compensating cylinder connected to said movable regulating means, connections for supplying fluid under pressure to said cylinder and for relieving the pressure therein, a pilot valve controlling said connections for automatically maintaining substantially constant pressure in said compensating cylinder, and a speed governor connected to additionally control said pilot valve.

6. A constant volume regulator for a motor driven turbo compressor, comprising an intake conduit for the compressor, a receptacle, a bell shaped float within said receptacle, one side of said float being subjected to fluid pressure at a point in the intake at which the velocity of the fluid is increased whereby fluctuations in pressure differences on the two sides of the float cause the float to move up or down to vary the amount of fluid supplied to the motor of the compressor, a fluid pressure thrust compensating cylinder connected to said float, connections for supplying fluid under pressure to said cylinder and for relieving the pressure therein, a pilot valve controlling said connections for automatically maintaining substantially constant pressure in said compensating cylinder, and a speed governor connected to additionally control said pilot valve.

7. A constant volume regulator for a motor driven turbo compressor, comprising an intake conduit for the compressor, a receptacle, a bell shaped float within said receptacle, one side of said float being subjected to fluid pressure at a point in the intake at which the velocity of the fluid is increased whereby fluctuations in pressure difference on the two sides of the float cause the float to move up or down to vary the amount of fluid supplied to the motor of the compressor, a fluid pressure thrust compensating cylinder connected to said float, connections for supplying fluid under pressure to said cylinder and for relieving the pressure therein, a differential pilot valve controlling said connections for automatically maintaining substantially constant pressure in said compensating cylinder, said pilot valve being subjected to the compensating cylinder pressure on one side, and an adjustable spring for the pilot valve opposing the cylinder pressure.

In testimony whereof I have signed this specification.

LESLIE R. HUFF.